US012779739B2

(12) United States Patent
Maris

(10) Patent No.: US 12,779,739 B2
(45) Date of Patent: Nov. 3, 2026

(54) PROCESS FOR THE RECOVERY AND DEVULCANIZATION OF CROSS-LINKED RUBBER

(71) Applicant: F.LLI MARIS S.P.A., Rosta (IT)

(72) Inventor: Gianfranco Maris, Rivoli (IT)

(73) Assignee: F.LLI Maris S.P.A., Rosta (IT)

( * ) Notice: Subject to any disclaimer, the term of this patent is extended or adjusted under 35 U.S.C. 154(b) by 322 days.

(21) Appl. No.: 17/641,933

(22) PCT Filed: Sep. 9, 2020

(86) PCT No.: PCT/IB2020/058373
§ 371 (c)(1),
(2) Date: Mar. 10, 2022

(87) PCT Pub. No.: WO2021/048756
PCT Pub. Date: Mar. 18, 2021

(65) Prior Publication Data
US 2022/0305697 A1 Sep. 29, 2022

(30) Foreign Application Priority Data
Sep. 11, 2019 (IT) ........................ 102019000016061

(51) Int. Cl.
*B29B 17/04* (2006.01)
*B29B 9/02* (2006.01)
(Continued)

(52) U.S. Cl.
CPC ................ *B29B 17/04* (2013.01); *B29B 9/02* (2013.01); *B29B 17/02* (2013.01); *C08J 11/06* (2013.01);
(Continued)

(58) Field of Classification Search
CPC ........... B29B 17/04; B29B 17/02; B29B 9/02; B29B 2017/0484; B29B 2017/044;
(Continued)

(56) References Cited

U.S. PATENT DOCUMENTS 4,448,737 A * 5/1984 Johnson ................ B29C 44/507
264/37.32
6,042,260 A * 3/2000 Heidemeyer ......... B29C 48/405
366/100
(Continued)

FOREIGN PATENT DOCUMENTS

CN 201040408 * 3/2000 ............. B29B 17/00
CN 102344592 A 2/2012
(Continued)

OTHER PUBLICATIONS

CN201040408 English translation prepared Apr. 12, 2024 (Year: 2024).*
(Continued)

*Primary Examiner* — Alison L Hindenlang
*Assistant Examiner* — Shibin Liang
(74) *Attorney, Agent, or Firm* — Armstrong Teasdale LLP

(57) ABSTRACT

A process for recovery and devulcanization of vulcanized rubber is provided. The process takes place in a plant including a mill for grinding vulcanized rubber into particles, a twin-screw extruder provided with a device for forced feeding of vulcanized rubber particles and a thermostatting device, a single-screw extruder arranged downstream of the twin-screw extruder and equipped with a thermostatting device, a filter for devulcanized rubber and an extrusion die shaped like a slot, from the which devulcanized rubber comes out in the form of a strip or sheet, and a cooling device for the devulcanized rubber strip or sheet. The twin-screw extruder operates at a temperature between
(Continued)

35 and 450° C., with a rotation speed of the screws between 15 and 600 rpm, and a torque density between 11 and 18 Nm/cm$^3$, so that the shear rate remains constant for the entire longitudinal extension of the twin-screw extruder.

15 Claims, 3 Drawing Sheets

(51) Int. Cl.
*B29B 17/02* (2006.01)
*C08J 11/06* (2006.01)

(52) U.S. Cl.
CPC ................. *B29B 2017/0224* (2013.01); *B29B 2017/0464* (2013.01); *B29B 2017/0484* (2013.01); *C08J 2317/00* (2013.01); *C08J 2319/00* (2013.01)

(58) Field of Classification Search
CPC ............... B29B 2017/0224; C09J 11/06; C08J 2317/00; C08J 2319/00
See application file for complete search history.

(56) References Cited

U.S. PATENT DOCUMENTS

| | | | | |
|---|---|---|---|---|
| 2009/0082475 | A1 * | 3/2009 | Zhang | C08L 19/003 521/45.5 |
| 2013/0119575 | A1 | 5/2013 | Whaley et al. | |
| 2019/0375142 | A1 * | 12/2019 | Lima De Aguiar | B29C 48/288 |

FOREIGN PATENT DOCUMENTS

| | | | | | |
|---|---|---|---|---|---|
| CN | 102344592 | | * | 8/2012 | B29C 47/60 |
| EP | 0258159 | A1 | | 3/1988 | |
| EP | 1136228 | B1 | | 5/2009 | |
| EP | 2601249 | A1 | | 6/2013 | |
| EP | 2995436 | A1 | | 3/2016 | |
| EP | 3178628 | A1 | | 6/2017 | |
| GB | 133369 | | * | 10/1919 | |
| JP | 2013035272 | A | | 2/2013 | |

OTHER PUBLICATIONS

CN102344592 English translation prepared Apr. 12, 2024 (Year: 2024).*

International Search Report and Written Opinion for International Patent Application No. PCT/IB2020/058373, mailed Dec. 22, 2020, 11 pages.

Saïd Seghar et al., Thermo-mechanical devulcanization and recycling of rubber industry waste, Resources, Conservation and Recycling, May 2019, pp. 180-186, vol. 144, Elsevier B.V., Amsterdam, NL.

Mohammad Karrabi et al., A Study of EPDM Devulcanization in a Co-rotating Twin-screw Extruder, Iranian Polymer Journal, Aug. 1, 2007, pp. 327-335, vol. 16, No. 5, Iran Polymer and Petrochemical Institute, IR.

* cited by examiner

PROCESS FOR THE RECOVERY AND DEVULCANIZATION OF CROSS-LINKED RUBBER

CROSS-REFERENCE TO RELATED APPLICATIONS

This application is a National Phase filing of PCT International Application No. PCT/IB2020/058373, having an International Filing Date of Sep. 9, 2020, claiming priority to Italian Patent Application No. 102019000016061, having a filing date of Sep. 11, 2019, each of which is hereby incorporated by reference in its entirety.

This invention refers to a process for the recovery and devulcanization of cross-linked rubber.

FIELD OF THE INVENTION

Typically, the rubber to be recovered is made up of industrial processing waste and/or articles that have reached the end of their useful life, coming from specialized collection centers and/or landfills.

BACKGROUND OF THE INVENTION

The molecular chains of vulcanized rubber are typically joined by chemical bonds developing through bridges of sulfur atoms that join them transversely. Vulcanized rubber thus has a structure similar to that of a thermosetting polymer and may not be reused as such in the production cycle.

Plants are known that administer to the cross-linked rubber a quantity of energy such as to break the chemical bonds created by the sulfur, so that the elastomeric material returns to its original physical-chemical state prior to the vulcanization treatment and is ready to be reused in the production cycle.

However, despite increasingly selective and high-performance waste sorting processes becoming more widespread, the rubber collected to undergo devulcanization treatments usually contains particles of other substances that pollute the devulcanized rubber finally obtained, compromising the properties thereof.

SUMMARY OF THE INVENTION

An object of this invention is therefore to provide a process to overcome this drawback due to the impurities inevitably present in the vulcanized rubber to be processed.

This object is achieved by a process for the recovery and devulcanization of cross-linked rubber as described and claimed herein. Preferred features of the process of the present invention are also described.

This invention satisfies the needs currently felt on the market regarding the purity of devulcanized rubbers, making it possible to carry out a non-degrading recovery process which requires a reduced energy input and produces a final plastics material, devulcanized and substantially free from impurities and pollutants.

BRIEF DESCRIPTION OF THE DRAWINGS

Further advantages and features of this invention will be evident from the detailed description below, provided by way of non-limiting example with reference to the accompanying drawings, wherein.

DETAILED DESCRIPTION

Figure 1:
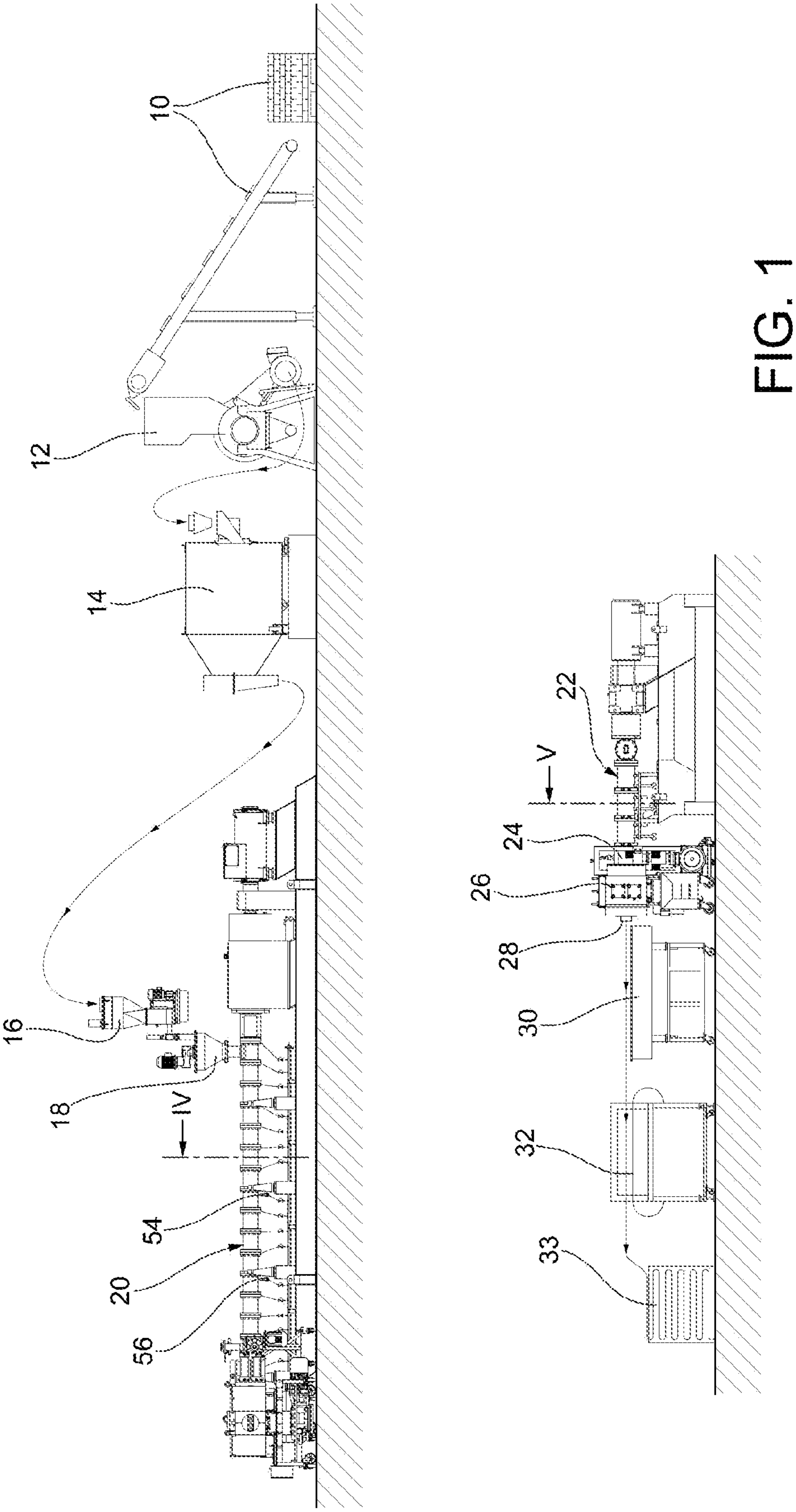
FIG. 1 is a schematic elevation view of a plant for implementing the process of the invention, which for greater clarity has been divided into two parts.

A plant for the recovery and devulcanization of vulcanized rubber 10 comprises (FIGS. 1 and 2) a mill 12 for the grinding and devulcanization of the rubber 10, downstream of which mill 12 a homogenizer 14 and a gravimetric/volumetric dosing unit 16 is located, which feeds the rubber particles produced in the mill 12 to a device 18 which forcibly feeds said particles into a twin-screw devulcanization extruder 20.

Downstream of the twin-screw extruder 20 there is a single-screw extruder 22, equipped with a gear pump 24, a filter 26 for the devulcanized rubber and an extrusion die 28 shaped like a slot, from which devulcanized rubber emerges in the form of a strip or sheet.

Downstream of the extrusion die 28 there are a tank 30 containing cooling water, a water removal and drying tunnel 32 and a device 33 for collecting the strip or sheet of devulcanized rubber.

The forced feeding device 18 is known per se and allows an easy introduction into the twin-screw extruder 20 of vulcanized rubber particles having different shape, particle size and apparent density. The device is typically formed (FIG. 3) of a hopper 34 and a cylinder 36 within which one or more screws 38 with conical or cylindrical geometry rotate; it is positioned vertically relative to the extruder (or laterally in embodiments not shown) and may have mechanical, electrical or pneumatic drive, so as to force the vulcanized rubber particles into the twin-screw extruder 20. The use of such a device 18 increases the filling rate of the free volumes of the screws of the extruder 20 and has proven to be particularly effective in the processing of expanded vulcanized rubbers, typically having a density between 50 and 350 kg/m$^3$. In this case, a greater filling of the screws allows a considerable increase in productivity, i.e. by over 100% compared to the case wherein the forced feeding device 18 is absent, further reducing drastically the degradation of the rubber due to an excess of shear stress.

The shear rate (or geometric shear rate) is kept constant within the extruder 20 for its entire length, allowing the cross bonds between the molecular chains of the rubber to break and the possible degradation of the devulcanized rubber to be avoided. The high filling rate of the extruder 20, determined by the forced feeding device 18, ensures that in each zone there is a constant presence of material so as to make the advancement, as well as the stresses imparted, uniform. Conversely, in the absence of the forced feeding device 18, the processed material would be subjected, due to its shape and density, to different shear rates within the extruder 20, which could degrade it. Likewise, in the transition from vulcanized rubber to devulcanized rubber, the high filling rate facilitates cooling which is also capable of counteracting degradation.

Moreover, the forced feeding device 18 increases the operating flexibility of the plant by allowing particles with different particle size in the form of powders or granules with a size between 0.2 and 15 mm to be processed.

The twin-screw extruder 20 is advantageously comprised of cylindrical modules normally having a length equal to 4 times the outer diameter of the screws and mounted in series so as to form a continuous cylinder. Typically, the twin-screw extruder 20 has a length at least equal to 64 times the outer diameter of the screws, and preferably not greater than 80 times the outer diameter of the screws.

Figure 4:
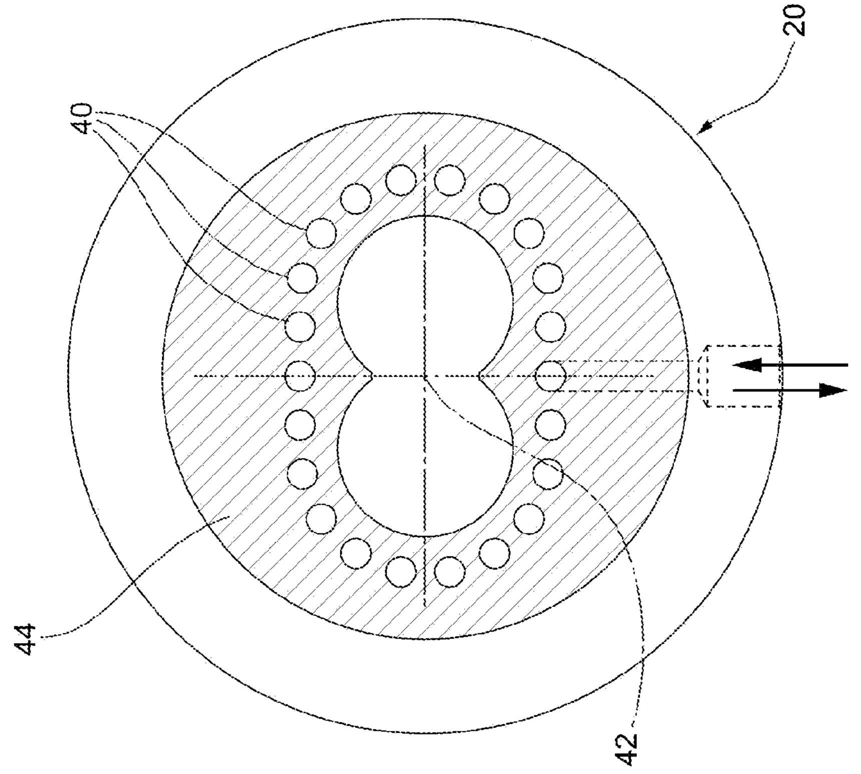
FIG. 4 is a sectional view according to the line IV-IV in FIG. 1.

The extruder 20 is provided with a thermostatting device which on one hand comprises a plurality of electrical resistors attached to the outer surface of the cylinder, and on the other (FIG. 4) a water cooling circuit formed of a plurality of tubular holes 40 obtained as a labyrinth that extend parallel to the longitudinal axis 42 of the extruder in the wall 44 of the relative cylinder about the central cavity thereof. By adjusting the alternation of heating and cooling phases in a desired manner, the energy administered to the elastomeric material is kept under control, preventing its degradation after the breakdown of the cross-linked chemical bonds between the molecular chains.

The ratio between the outer and inner diameter of the screws is between 1.22 and 1.78 and preferably between 1.55 and 1.78. In a manner known per se and not illustrated in the figures, sequences of conveying and mixing elements are individually configured on the multi-row shafts of the screws, in particular having a geometric profile so as to make the filling uniform, as described in EP-1 136 228 B1, which allow the shear stresses imparted to the rubber, and therefore the specific energy absorbed by said rubber, to be kept uniform and under control.

Typically the torque density is between 11 and 18 $Nm/cm^3$ and ensures, together with a rotation speed of the screws between 15 and 600 rpm, a high filling rate of the screws with a shear rate remaining low and constant for the entire length of the extruder 20. The final result is greater productivity, with top values up to 40-60% and a lower operating temperature with respect to the case wherein an extruder having similar geometric parameters with the same rotation speed of the screws but with a lower torque density is used.

The single-screw extruder 22 comprises in a manner known per se a cylinder and a main motor mechanically connected to a speed reducer in turn connected to a plasticizing screw which rotates inside the cylinder, the length of which is typically equal to 8 to 20 times the diameter of the respective screw.

Figure 5:
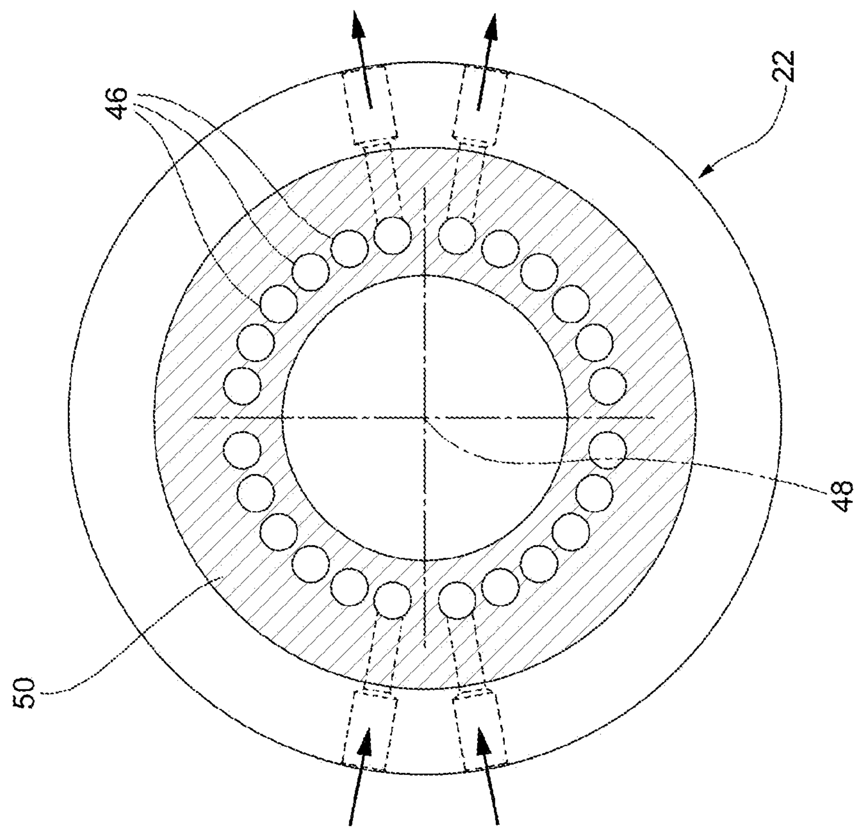
FIG. 5 is a sectional view according to the line V-V in FIG. 1.

The extruder 22 is provided with a thermostatting device which on one hand comprises a plurality of electrical resistors fixed on the outer surface of the cylinder, and on the other a water cooling circuit formed (FIG. 5) with a plurality of tubular holes 46 obtained as a labyrinth that extends parallel to the longitudinal axis 48 of the extruder 22 in the wall 50 of the cylinder in the form of a circular crown about the central cavity thereof.

The screw for conveying the material inside the cylinder may be of the type with forced cooling by internal water circulation.

The filter 26 with which the extruder 22 is provided includes a conventional grid and may be of the semiautomatic or automatic type, both types allowing a continuous flow of the molten material on two distinct channels. It goes without saying that, unlike the semi-automatic type, the automatic type may ensure a continuous production without the operators' technical supervision.

The presence of the filter 26 increases the resistance that the rubber encounters to proceed along the extruder 22 causing an increase in pressure and consequently in temperature, which could cause a degradation thereof.

This effect is however compensated by the thermostatting device, in particular by the preferably double water cooling circuit, together with the mixing action exerted by the screw, which makes the temperature uniform by gradually bringing new portions of rubber into contact with the cooled surfaces of the screw and cylinder. The combination of these measures thus succeeds in significantly lowering the temperature of the devulcanized rubber.

Advantageously, the die 28 at the outlet from the extruder 22 has a variable geometry, so as to allow the dimensions of the extruded devulcanized rubber strip or sheet to be determined in a desired manner.

Figures 2, 3, 6:
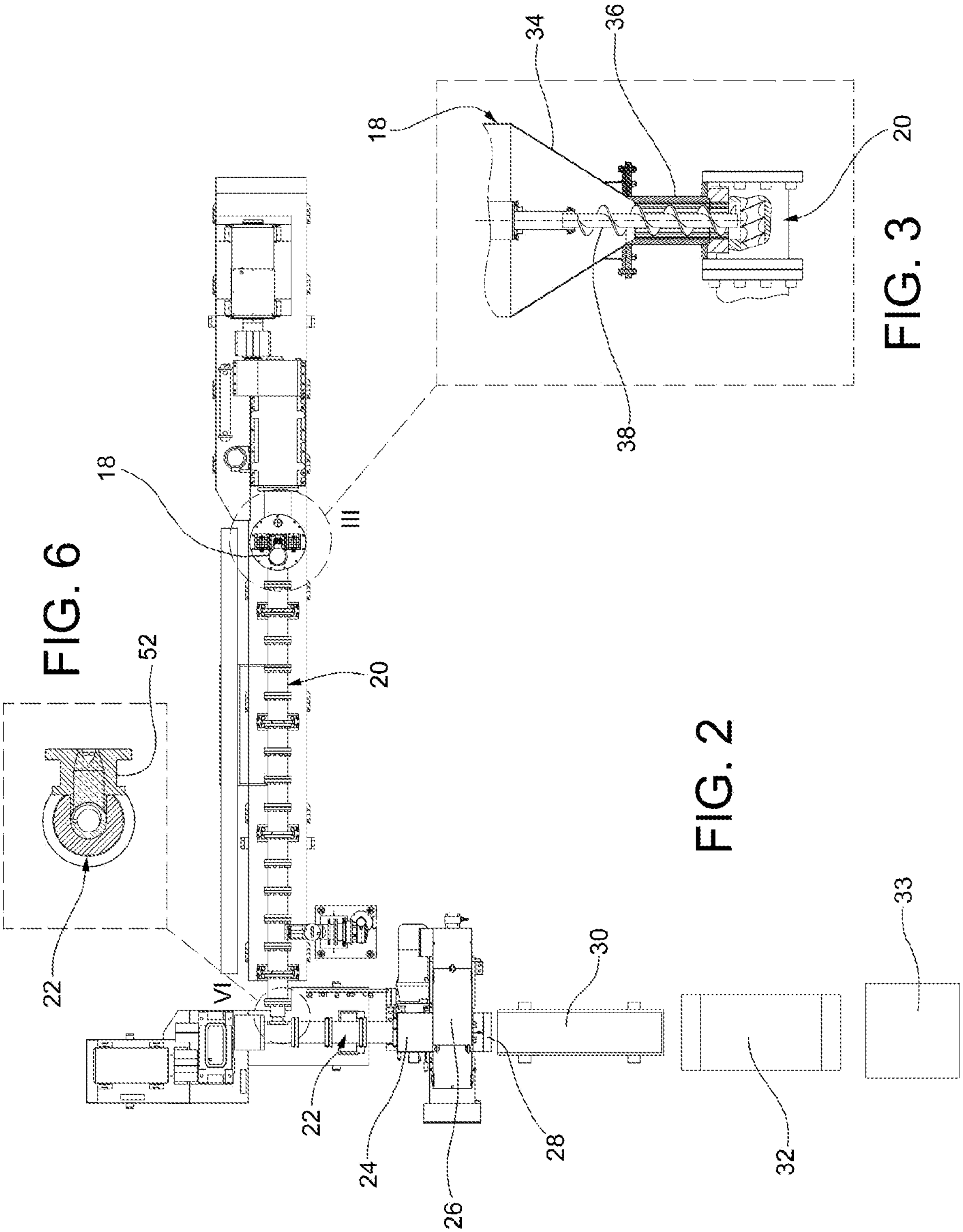
FIG. 2 is a schematic plan view of the plant in FIG. 1.
FIG. 3 is an enlarged scale view of a detail in FIG. 2.
FIG. 6 is an enlarged scale view of a further detail in FIG. 2.

The plant further comprises means for allowing the devulcanized rubber to pass from the twin-screw extruder 20 to the single-screw extruder 22. In particular, FIG. 6 illustrates a connecting element 52 for the direct connection of the twin-screw extruder 20 to the single-screw extruder 22.

In alternative embodiments of the invention not illustrated in the figures, the aforesaid means for allowing the devulcanized rubber to pass from the twin-screw extruder 20 to the single-screw extruder 22 may include:

- a hopper which collects the devulcanized rubber extruded from the twin screw extruder 20 and feeds it into the single-screw extruder 22; or
- one or more pairs of facing pressure rollers, which transfer a devulcanized rubber strip coming from the twin-screw extruder 20 into the single-screw extruder 22.

The plant described above may be used to process vulcanized elastomers having substantially any chemical nature and previously used to make up any type of articles, such as in particular tires for cars, heavy vehicles and airplanes. Examples of elastomers that may be devulcanized are natural rubber (NR), butadiene rubber (BR), ethylene propylene rubber (EPR), styrene butadiene rubber (SBR), nitrile rubber (NBR), ethylene propylene diene monomer rubber (EPDM), isoprene rubber (IR), chloroprene rubber (CR), acrylic rubber, silicone rubber, as well as polyurethanes and chlorosulfonated polyethylenes.

It should be noted that other substances must not be added to the elastomers to be processed, such as thermoplastic materials or process additives, which consequently reduces process costs as well as the environmental impact associated with the use thereof.

Specifically, the vulcanized rubber is sent to the mill 12, which reduces it into particles of the desired size, and then to the homogenizer 14. The rubber particles thus obtained are then introduced through the dispenser 16 into the forced feeding device 18 which feeds them into the twin-screw extruder 20 which carries out the devulcanization of the rubber.

The extruder 20 operates at a temperature between 35 and 450° C., with a rotation speed of the screws between 15 and 600 rpm, and a torque density between 11 and 18 $Nm/cm^3$, resulting in a high filling rate of the screws and a substantially constant shear rate for the entire longitudinal development of the twin-screw extruder.

The cooling of the material may be facilitated by the injection of water at one or more points 54 of the twin-screw extruder 20 located at a distance equal to at least 32 times the outer diameter of the screws from the initial section, i.e. only after the devulcanization has taken place. The quantity of injected water may be between 1 and 30% by weight with respect to the quantity of rubber processed. The injected and subsequently vaporized water, as well as other gaseous components produced by devulcanization, may be removed in a manner known per se by degassing means 56 such as extraction screws or suction pumps located in one or more discharge ducts which branch transversely from the extruder cylinder 20. The distance between a water injection point 54 and the subsequent degassing point 56 is preferably between 4 and 24 times the outer diameter of the screws, and even more preferably between 8 and 16 times the outer diameter of the screws.

The injection of water allows the temperature of the rubber to be lowered by about 20-30° C. relative to operating in anhydrous conditions, so as to prevent degradation phenomena induced by temperature and to reduce the odor of the devulcanized rubber produced due to the stripping action exerted by the vapor on the substances that generate this odor. The injection of water which suddenly cools the rubber immediately after devulcanization also has the effect of increasing its Mooney viscosity by about 6%.

The devulcanized rubber exiting the twin-screw extruder 20 is then guided through the connecting element 52 into the single-screw extruder 22 where its temperature is reduced by about 15-30° C.

Passing through the filter 26, the lumps of foreign substances normally originally present in the rubber to be processed are stopped, so that said rubber is purified, reaching a qualitative level comparable to that of the virgin product.

The rubber is finally extruded through the die 28 in the form of a strip or sheet, which is passed by immersion into the tank 30 to be further cooled by the water contained therein. Advantageously, the water may contain anti-packing additives.

The strip or sheet coming out of the tank 30 is then made to pass into the drying tunnel 32 and finally sent to the collection device 33.

Naturally, without prejudice to the principle of the invention, the details of implementation and the embodiments may vary widely relative to that which has been described purely by way of example, without thereby departing from the scope of the invention as defined in the accompanying claims.

What is claimed is:

1. A process for recovery and devulcanization of vulcanized rubber through the use of a plant comprising:

a mill for grinding the vulcanized rubber into particles without adding process additives to the vulcanized rubber, a continuous twin-screw extruder for devulcanization, provided with a first thermostatting device and a forced feeding device configured to control a filling rate of the twin-screw extruder such that there is a constant volume of the additive-free vulcanized rubber particles along an entire longitudinal extension of said twin-screw extruder, a single-screw extruder arranged downstream of said twin-screw extruder, and provided with a second thermostatting device, a filter for the extruded, additive-free devulcanized rubber, and an extrusion die shaped like a slot, from which the twice-extruded, additive-free devulcanized rubber comes out in the form of a strip or sheet, and a cooling device for the strip or sheet of additive-free devulcanized rubber, wherein said twin-screw extruder operates at a temperature in a range of between 35 and 450° C., a screw rotation speed between 15 and 600 rpm, and a torque density between 11 and 18 $Nm/cm^3$, so that shear rate remains constant for the entire longitudinal extension of the twin-screw extruder to convey a constant shear stress to the additive-free vulcanized rubber particles along the entire longitudinal extension of the twin-screw extruder, and wherein the first thermostatting device is configured to alternatively adjust heating and cooling phases applied to the additive-free vulcanized rubber particles in said twin-screw extruder to maintain the temperature within the range.

2. The process of claim 1, wherein the ratio between an outer diameter and an inner diameter of screws of the twin-screw extruder is between 1.22 and 1.78.

3. The process of claim 1, wherein said twin-screw extruder has a length at least equal to 64 times the outer diameter of the screws.

4. The process of claim 3, wherein the twin-screw extruder has a length not greater than 80 times the outer diameter of the screws.

5. The process of claim 1, wherein said plant further comprises, for transferring the extruded, additive-free devulcanized rubber from the twin-screw extruder into the single-screw extruder:

a connecting element that directly connects the twin-screw extruder to the single-screw extruder; or a hopper that collects the extruded, additive-free devulcanized rubber extruded from the twin-screw extruder and feeds the extruded, additive-free devulcanized rubber into the single-screw extruder; or at least one pair of facing pressure rollers that transfer the extruded, additive-free devulcanized rubber coming from the twin-screw extruder into the single-screw extruder.

6. The process of claim 1, wherein said extrusion die has a variable geometry.

7. The process of claim 1, wherein said cooling device consists of a tank filled with water, and wherein the strip or sheet of additive-free devulcanized rubber is immersed in said tank filled with water.

8. The process of claim 1, wherein water is injected into at least one point of the twin-screw extruder located at a distance from an inlet equal to at least 32 times the outer diameter of the screws.

9. The process of claim 8, wherein said twin-screw extruder is provided with degassing means for removal of gases and/or vapors formed therein.

10. The process of claim 9, wherein the distance between a water injection point and a subsequent point where the degassing means are located is between 4 and 24 times the outer diameter of the screws.

11. The process of claim 10, wherein the distance between the water injection point and the subsequent point where the degassing means are located is between 8 and 16 times the outer diameter of the screws.

12. The process of claim 1, wherein the first thermostatting device includes a plurality of electrical resistors and a water-cooling circuit to perform said alternatively adjusting heating and cooling phases applied to the additive-free vulcanized rubber particles in said twin-screw extruder to maintain the temperature within the range.

13. The process of claim 12, wherein the water-cooling circuit comprises a labyrinth of tubular holes extending parallel to the longitudinal extension of the twin-screw extruder.

14. The process of claim 1, wherein the second thermostatting device provides a cooling effect to the additive-free vulcanized rubber particles within said single-screw extruder.

15. The process of claim 1, wherein the force feeding device includes a hopper and a cylinder within which one or more screws rotate to control the filling rate by forcing the additive-free vulcanized rubber particles into the twin-screw extruder.

* * * * *